United States Patent
Ekeroth

[11] Patent Number: 6,105,730
[45] Date of Patent: Aug. 22, 2000

[54] BRAKE LINING WEAR INDICATING DEVICE

[75] Inventor: Mats Ekeroth, Landskrona, Sweden

[73] Assignee: Haldex Brake Products AB, Landskrona, Sweden

[21] Appl. No.: 08/973,707

[22] PCT Filed: May 29, 1996

[86] PCT No.: PCT/SE96/00686

§ 371 Date: Nov. 19, 1998

§ 102(e) Date: Nov. 19, 1998

[87] PCT Pub. No.: WO96/41970

PCT Pub. Date: Dec. 27, 1996

[30] Foreign Application Priority Data

Jun. 8, 1995 [SE] Sweden ................................... 9502094

[51] Int. Cl.[7] .................................................... F16D 66/00
[52] U.S. Cl. .................... 188/1.11; 324/207.2; 324/207.5
[58] Field of Search ......................... 188/1.11 E, 1.11 W, 188/1.11 L, 1.11 R; 324/207.2, 207.5; 116/208, 204

[56] References Cited

U.S. PATENT DOCUMENTS

| | | | |
|---|---|---|---|
| 4,440,268 | 4/1984 | Karlsson | 188/79.5 |
| 5,253,735 | 10/1993 | Larson | 188/1.11 L |
| 5,313,159 | 5/1994 | Allwine | 324/207.5 |
| 5,757,180 | 5/1998 | Chou | 324/207.2 |

Primary Examiner—Robert J. Oberleitner
Assistant Examiner—Devon Kramer
Attorney, Agent, or Firm—James Ray & Associates

[57] ABSTRACT

An automatic brake lever (1) with a built-in slack adjuster is intended for transmitting brake force from a brake cylinder and is mounted on a brake actuating cam shaft (2). For the purpose of accomplishing a wear indicating device, a coded disc (10) is connected to the cam shaft, whereas a housing (9, 11) therefore is connected to the brake lever or a fix-point for the lever. The coded disc is provided with a number of coded paths of circular shape, magnetic areas of equal length being provided in each coded path. A number of hall-elements (15) corresponding to the number of coded paths are provided in the cover (11) of the housing, each hall-element being arranged to sense the magnetic areas in the respective coded path. The signals from the hall-elements together indicate the relative position between the disc and the cover.

9 Claims, 3 Drawing Sheets

BRAKE LINING WEAR INDICATING DEVICE

TECHNICAL FIELD

This invention relates to a device for indicating wear of brake linings in a vehicle brake, preferably actuated via an automatic brake lever with a built-in brake adjuster, the lever being intended for transmitting brake force from a brake cylinder and being mounted on a brake actuating cam shaft. The device may also be used for indicating the stroke of a brake cylinder push rod connected to the brake lever. Although the device is stated to be used with a brake lever, other similar uses are possible within the scope of the invention.

BACKGROUND OF THE INVENTION

Many devices for the above purpose are known, ranging from simple mechanical devices to rather complicated electrical or electronic devices. A good example of the latter category is the device shown in U.S. Pat. No. 5,253,735, which is regarded is the closest prior art. Here, three discs, which are rotatable relative to each other and are arranged on the cam shaft adjacent the brake lever, are provided with magnets and hall-elements in a certain arrangement for supplying certain information about the condition of the brake.

The basic function of a device as defined is to supply information about the wear of the brake linings, so that they can be replaced in time, and accordingly the name wear sensor may be used. However, a wear sensor properly designed and installed can also supply useful information about the piston stroke of the brake cylinder used and about the overall function of the brakes on the vehicle.

It is of great importance that a wear sensor is sturdy and can resist the extremely harsh environmental conditions under the vehicle. The sensor shall also have small dimensions due to the often very limited available space. The information provided from the sensor shall be as accurate as possible and shall be compatible with other information available in modern vehicles, where computers and other electronic equipment are used to an increasingly large extent.

THE INVENTION

A wear sensor fulfilling the above and other requirements is according to the invention obtained in that a coded disc, on its surface being divided into a number of equally large circle sectors, has at least one coded path, shaped as a circle segment, with equally long magnetic areas in each sector, the magnetic areas being of different lengths in different coded paths, and that a hall-element is provided in a part adjacent the coded disc for sensing each coded path, the coded disc and said part being rotationally arranged in relation to each other.

The coded disc is preferably connected to the cam shaft, whereas the hall-elements are arranged in a cover of a housing for the device.

In a practical and preferred embodiment the coded disc has three sectors each with an angle of 120°, which in principle will be the maximal operating range of the wear sensor; two of these sectors have two coded paths each, whereas the third sector has three coded paths, and the number of hall-elements is seven.

In this way the accuracy of the device will be 10°, which is regarded as very good.

If only information about the wear condition is required, the wear sensor housing is connected to the brake lever, which gives a simple device with comparatively few variants.

If also information about the brake cylinder piston stroke and the brake function is desired, the housing shall be connected to a fixed part in the vehicle underframe.

Electronic circuitry for transforming the signals from the hall-elements into an analog or digital output signal suitable for further processing in the vehicle is mounted in the cover.

The total thickness of the device (coded disc and housing with hall-elements as well as electronic circuitry) may be as small as 10 mm, which in many instances is the only available space for the sensor.

BRIEF DESCRIPTION OF THE DRAWINGS

The invention will be described in further detail below, reference being made to the accompanying drawings, in which.

DETAILED DESCRIPTION OF PREFERRED EMBODIMENTS

Figure 1:
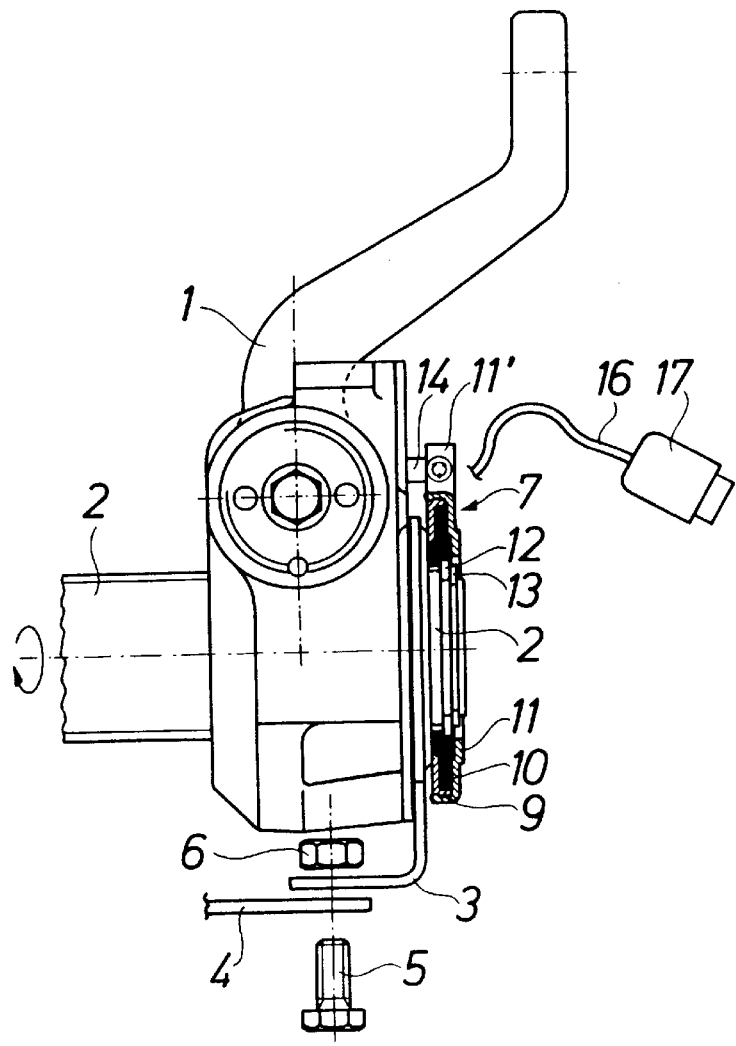
FIG. 1 is a side view, partly in section, of an automatic brake lever with a first embodiment of a device or a wear sensor according to the invention.
Figure 4:
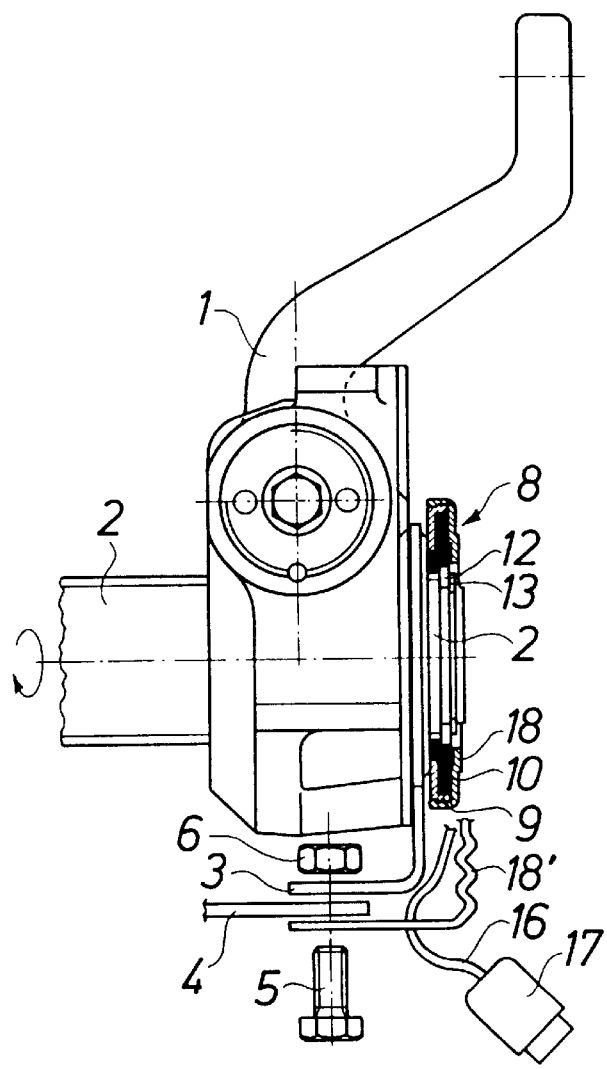
FIG. 4 is a side view, partly in section, of an automatic brake lever with a second embodiment of a wear sensor according to the invention.

An automatic brake lever 1, shown in FIGS. 1 and 4, is well known in the art. It has a built-in brake adjuster and is mounted on a splined S-cam shaft 2. In a way not illustrated in FIGS. 1 and 4 this shaft 2 is provided at its other end with an S-cam, which when turned brakingly presses brake linings on brake shoes against a brake drum. With its upper end in FIGS. 1 and 4 the brake lever 1 is connected with a push rod of a preferably pneumatic brake cylinder, which is attached to a vehicle underframe.

This S-cam brake arrangement is common on heavy road vehicles, such as trucks and buses.

The purpose of the brake adjuster built-into the brake lever 1 is to keep the slack between each brake lining and the brake drum constant irrespective of the wear of the brake lining. It so does by gradually turning or rotating the cam shaft 2 in relation to the brake lever 1. The total rotation of the cam shaft 2, when the brake linings are worn out, is in the order of 90–100°.

For performing its intended function an automatic brake lever 1 needs a reference point or fix-point. In the shown case this is realized by means of a control arm 3, which is rotatable in relation to the brake lever 1 and is connected to a fixed arm 4, attached to the vehicle underframe, by means of a screw 5 and a nut 6.

In order primarily to obtain an indication of the wear of the brake linings but also of the stroke of the push rod connecting the brake lever 1 to the brake cylinder a sensor 7 (FIG. 1) or 8 (FIG. 4) is arranged at the brake lever 1 in a way now to be further described.

Figure 2:
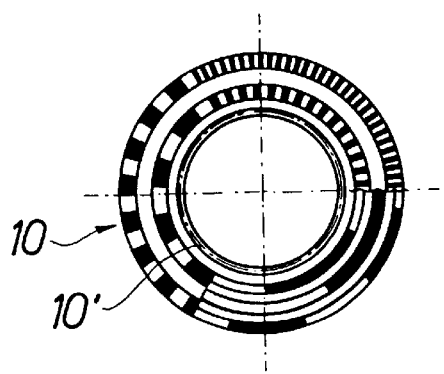
FIG. 2 is a front view from the right in FIG. 1 of a coded disc in the sensor.
Figure 3:
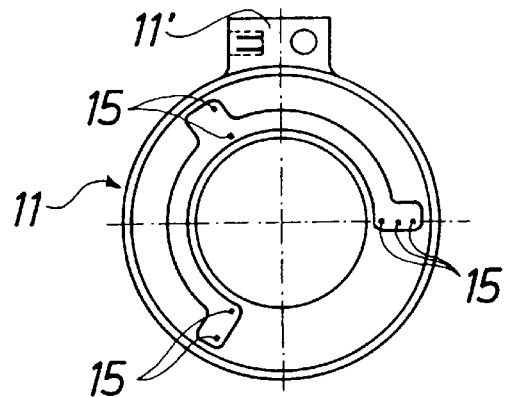
FIG. 3 is a front view from the left of a cover for the sensor.

A sensor 7 as shown in FIG. 1 consists of three parts: a base ring 9, a coded disc 10 (FIG. 2), and a cover 11 (FIG. 3).

The coded disc 10 is rotatable in relation to its housing, which is formed of the base ring 9 and cover 11 snapped together to a unit. The inner periphery 10' of the coded disc 10 is designed to fit on the splines of the S-cam shaft 2 so as to be rotatable therewith, when the sensor 7 is mounted on the end of the shaft 2 extending out from the brake lever 1 and suitably held in position, such as by a washer 12 and a locking ring 13. In the embodiment according to FIG. 1 the sensor housing 9, 11 is connected to the brake lever 1, as illustrated at 14. For this purpose the cover 11 is provided with a lug 11'.

The coded disc 10 is provided with a pattern of magnetic areas to be described and may be made of polyamide with magnetic material, whereas the cover 11 is provided with a number of hall-elements 15 for sensing the magnetic areas.

It has already been mentioned that the total rotation of the brake lever 1, until the brake linings are worn-out, is in the region of 90–100°. Added to this is a further rotation corresponding to the maximum push rod stroke of some 30°. The sensor 7 shall accordingly have the capacity to emit signals for rotation in the range of 0–120°.

This capacity is obtained in that the surface of the coded disc 10 is divided into three sectors with an angle of 120° each. (Deviations from the exact value 120° are possible.) In two of these sectors there are two coded paths in the shape of segments of a circle and in the third sector three such coded paths. Each such coded path comprises a number of consecutive magnetic south-poles and north-poles, illustrated in FIG. 2 as white and hatched areas, respectively. The lengths of the magnetic areas differ between the coded paths, but within a certain coded path the south-poles and north-poles have the same length.

Each hall-element 15 in the cover 11 is intended to sense the presence of a south-pole or a north-pole in a certain coded path. Accordingly, the number of hall-elements 15 in the cover 11 is seven in groups of two, two, and three, respectively.

At a relative rotation bewwen the coded disc 10 and the cover 11, where the arrangement of the magnetic areas and the hall-elements is as described above, it can be demonstrated that the combination of the signals from the seven hall-elements 15 will provide an accuracy of 1°.

In the following table the angle range 30–40° has been randomly chosen to demonstrate that each degree corresponds to a certain combination of signals (1=north-pole, 0=south-pole) from the seven hall-elements 15:

|  | Hall-element no | | | | | | |
| --- | --- | --- | --- | --- | --- | --- | --- |
|  | 1 | 2 | 3 | 4 | 5 | 6 | 7 |
| 30° | 1 | 0 | 0 | 0 | 1 | 0 | 0 |
| 31° | 0 | 0 | 0 | 0 | 1 | 0 | 0 |
| 32° | 0 | 0 | 0 | 0 | 1 | 1 | 0 |
| 33° | 1 | 0 | 0 | 0 | 1 | 1 | 0 |
| 34° | 1 | 1 | 0 | 0 | 1 | 1 | 0 |
| 35° | 0 | 1 | 0 | 0 | 1 | 1 | 0 |
| 36° | 0 | 1 | 1 | 0 | 1 | 1 | 0 |
| 37° | 1 | 1 | 1 | 0 | 1 | 1 | 0 |
| 38° | 1 | 0 | 1 | 0 | 1 | 1 | 0 |
| 39° | 0 | 0 | 1 | 0 | 1 | 1 | 0 |
| 40° | 0 | 0 | 1 | 1 | 1 | 1 | 0 |

Electronic circuits necessary for transforming the different signals from the hall-elements 15 into an analog or a digital output signal are also mounted in the cover 11. A cable 16 with a contact 17 is connected to the lug 11' for transmitting the output signal and an input voltage for the sensor.

In order to minimize the instantaneous current consumption during operation, the electronic circuitry is preferably arranged to make a sequential reading of the hall-elements. A normal hall-element has a rating of 5 mA, which for seven hall-elements operated concurrently means a total consumption of 35 mA (plus the consumption for the electronic circuitry). According to the invention the electronic circuitry is designed to operate the different hall-elements in sequence one at a time with a time interval in terms of milliseconds, which means that the instantaneous current consumption for the indicating device will only be 5 mA (plus the demand from the electronic circuitry) but still that the combined reading from the seven hall-elements will not suffer.

Figure 5:
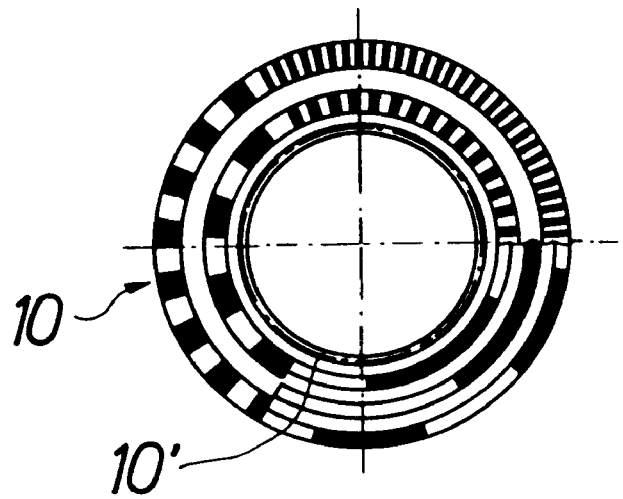
FIG. 5 is a front view from the right in FIG. 4 of a coded disc in this sensor.
Figure 6:
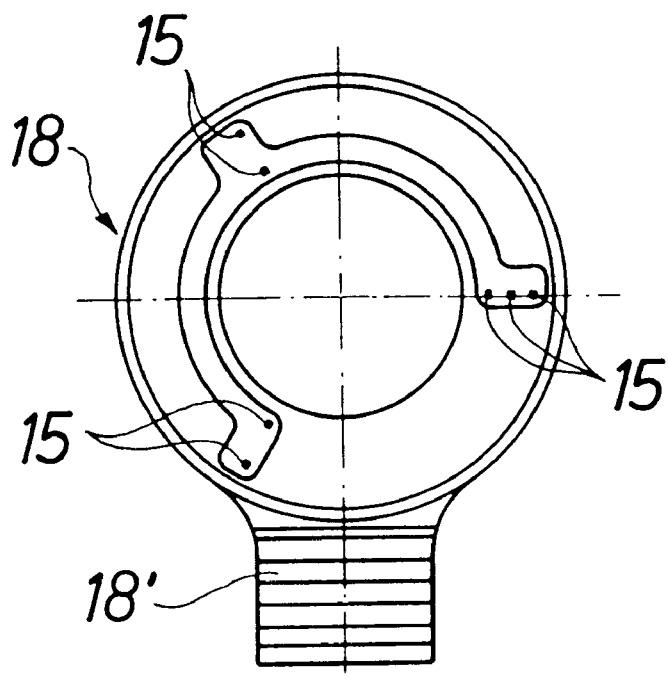
FIG. 6 is a front view from the left of a cover for the sensor.

A slightly modified embodiment is shown in FIGS. 4–6. With the exception of the cover for the sensor 8, all parts are the same as in the earlier embodiment and accordingly have the same numerals. The cover here bears the numeral 18. This cover 18 has a lug 18', which is connected to the fixed arm 4, to which also the control arm 3 of the brake lever 1 is connected. The cover 18 is provided with hall-elements 15 in the same way as the cover 11.

In the first embodiment according to FIGS. 1–3, which is simple and gives comparatively few installation variants, the sensor housing 9, 11 is connected to the brake lever 1 and thus is rotatable therewith, whereas the coded disc 10 is attached to the cam shaft 2 and is rotatable therewith. The signal provided through the cable 16 and the contact 17 is indicative for the relative rotational movement between the brake lever 1 and the cam shaft 2 and can accordingly only give information about the brake lining wear; this information, however, is basic for the device.

Further information can be derived from the embodiment according to FIGS. 4–6, where the sensor housing 9, 11 is connected to the fixed arm 4, attached to the vehicle underframe. Accordingly, this embodiment will give information about all the angular or rotational movements of the cam shaft 2.

Hereby, the following information in three areas may be derived:

1. Lining wear information: By knowing the angle-value at new brake linings it is easy to define the angle for worn-out linings.
2. Piston stroke information: By knowing the angle value for a fully released brake it is easy to compare this angle to the angle for an applied brake.
3. Brake function: By comparing the information from the different sensors at all the wheels of the vehicle it is easy to detect whether one brake is not properly functioning, for example if the brake air is disconnected or if the S-cam shaft is broken etc.

In the preferred embodiments the number of circle sectors is three and the number of coded paths and hall-elements seven, which with the described design gives an accuracy of 1°. However, designs with different numbers are possible and will provide different accuracies: lower numbers—lower accuracy and higher number—higher accuracy.

What is claimed is:

1. A device capable of indicating wear of brake linings in a vehicle brake, such vehicle brake being actuated by an automatic brake lever having a built-in brake adjuster, such automatic brake lever being capable of transmitting brake force from a brake cylinder and being mounted on a brake actuating cam shaft, said device comprising a single coded disc, on its surface being divided into a number of equally large circle sectors, having at least one coded path, shaped as a circle segment, with equally long magnetic areas in each sector, the magnetic areas being of different lengths in the different coded paths, and that a hall-element is provided in a part adjacent to and on one side of the coded disc for sensing each coded path, the coded disc and said part being rotationally arranged in relation to each other.

2. A device according to claim 1, wherein the coded disc is capable of being connected to such cam shaft and that the hall-elements are arranged in a cover of a housing for the device.

3. A device according to claim 1, wherein the coded disc has three circle sectors each with an angle of 120°, that two sectors have two coded paths each and one sector has three coded paths, and that the number of hall-elements is seven.

4. A device according to claim 2, wherein the housing is capable of being connected to such brake lever.

5. A device according to claim 2, wherein the housing is capable of being connected to a fixed part in an underframe of a vehicle.

6. A device according to claim 2, wherein electronic circuitry for transforming the signals from the hall-elements into an analog or digital output signal is mounted in the cover.

7. A device according to claim 6, wherein the electronic circuitry operates the different hall-elements sequentially in order to minimize instantaneous current consumption.

8. A device capable of indicating wear of brake linings in a vehicle brake, such vehicle brake being actuated by an automatic brake lever having a built-in brake adjuster, such automatic brake lever being capable of transmitting brake force from a brake cylinder and being mounted on a brake actuating cam shaft, said device comprising a single coded disc, on its surface being divided into three equally large circle sectors, each of said circle sectors having an angle of 120°, two of said sectors having two coded paths and a third sector having three coded paths, each of said sectors being shaped as a circle segment, with equally long magnetic areas in each sector, the magnetic areas being of different lengths in the different coded paths, and a total of seven hall-elements provided in a part adjacent the coded disc for sensing each coded path, the coded disc and said part being rotationally arranged in relation to each other.

9. A device capable of indicating wear of brake linings in a vehicle brake, such vehicle brake being actuated by an automatic brake lever having a built-in brake adjuster, such automatic brake lever being capable of transmitting brake force from a brake cylinder and being mounted on a brake actuating cam shaft, said device comprising a single coded disc which is capable of being connected to such cam shaft, a surface of said coded disc being divided into a number of equally large circle sectors, having at least one coded path, shaped as a circle segment, with equally long magnetic areas in each sector, the magnetic areas being of different lengths in the different coded paths, and that at least two hall-elements are provided in a cover of a housing for the device adjacent to the coded disc for sensing each coded path, said cover including electronic circuitry for transforming the signals from the hall-elements into an analog or digital output signal for operating the different hall-elements sequentially in order to minimize instantaneous current consumption, said coded disc and said cover being rotationally arranged in relation to each other.

* * * * *